US011859551B2

(12) United States Patent
O'Rorke et al.

(10) Patent No.: US 11,859,551 B2
(45) Date of Patent: Jan. 2, 2024

(54) FUEL SYSTEMS

(71) Applicant: Hamilton Sundstrand Corporation, Charlotte, NC (US)

(72) Inventors: Morgan O'Rorke, West Hartford, CT (US); Todd Haugsjaahabink, Springfield, MA (US); Matej Rutar, Manchester, CT (US); Ryan Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/581,506

(22) Filed: Jan. 21, 2022

(65) Prior Publication Data
US 2023/0235701 A1     Jul. 27, 2023

(51) Int. Cl.
*F02C 7/22* (2006.01)
*F02C 7/236* (2006.01)
*F02C 9/26* (2006.01)

(52) U.S. Cl.
CPC ............... *F02C 7/22* (2013.01); *F02C 7/236* (2013.01); *F02C 9/263* (2013.01); *F02C 9/26* (2013.01); *F05D 2220/323* (2013.01); *F05D 2240/35* (2013.01)

(58) Field of Classification Search
CPC .. F02C 7/22; F02C 7/236; F02C 7/232; F02C 9/26; F02C 9/263
See application file for complete search history.

(56) References Cited

U.S. PATENT DOCUMENTS

| | | | |
|---|---|---|---|
| 2,440,371 A | 4/1948 | Holley, Jr. | |
| 6,655,151 B2 | 12/2003 | Mahoney et al. | |
| 7,565,793 B2 * | 7/2009 | Shelby .................... | F02C 7/236 60/734 |
| 9,234,465 B2 | 1/2016 | Futa et al. | |
| 9,353,688 B2 | 5/2016 | Futa et al. | |
| 9,771,906 B2 | 9/2017 | Henson | |
| 10,330,023 B2 | 6/2019 | Selstad et al. | |
| 10,450,961 B2 | 10/2019 | Marocchini et al. | |
| 10,590,859 B2 | 3/2020 | Haugsjaahabink | |
| 10,968,832 B2 | 4/2021 | Portolese et al. | |
| 2005/0262824 A1 * | 12/2005 | Yates ...................... | F02C 7/232 60/39.281 |
| 2005/0284148 A1 * | 12/2005 | Wernberg ................. | F02C 9/30 60/734 |
| 2007/0199301 A1 | 8/2007 | Shelby et al. | |

(Continued)

OTHER PUBLICATIONS

Extended European Search Report for European Patent—Application No. EP23152752.4, dated Jun. 16, 2023.

*Primary Examiner* — Ehud Gartenberg
*Assistant Examiner* — Henry Ng
(74) *Attorney, Agent, or Firm* — Locke Lord LLP; Daniel J. Fiorello; Gabrielle L. Gelozin

(57) ABSTRACT

A fuel system can include a selection and shutoff valve (SSOV) configured to allow a primary flow having a primary flow pressure to pass therethrough in a first state such that the primary flow can travel to an output line. The SSOV can also be configured to shut off the primary flow in a second state to prevent the primary flow from travelling to the output line. In the second state, the SSOV can be configured to allow a secondary flow from a secondary flow source to pass therethrough such that the secondary flow can travel to the output line.

15 Claims, 2 Drawing Sheets

(56) References Cited

U.S. PATENT DOCUMENTS

| | | | | |
|---|---|---|---|---|
| 2010/0037867 A1* | 2/2010 | Kleckler | ................ | F02C 9/263 |
| | | | | 123/510 |
| 2010/0089025 A1* | 4/2010 | Baker | ................ | F02C 9/30 |
| | | | | 137/565.29 |
| 2011/0289925 A1* | 12/2011 | Dyer | ................ | F02C 7/232 |
| | | | | 60/734 |
| 2014/0196463 A1* | 7/2014 | Zielinski | ................ | F02C 7/236 |
| | | | | 60/734 |
| 2014/0205472 A1* | 7/2014 | Hutto, Jr. | ................ | F02C 7/236 |
| | | | | 417/244 |
| 2014/0311599 A1* | 10/2014 | Haugsjaahabink | ....... | F02D 1/02 |
| | | | | 137/565.11 |
| 2014/0345694 A1* | 11/2014 | Ballard | ................ | F02C 7/232 |
| | | | | 137/625.13 |
| 2017/0292451 A1* | 10/2017 | Reuter | ................ | F02C 7/22 |
| 2021/0102517 A1 | 4/2021 | Susca et al. | | |
| 2021/0388773 A1* | 12/2021 | Zielinski | ............. | G05D 7/0647 |

* cited by examiner

FUEL SYSTEMS

STATEMENT OF GOVERNMENT RIGHTS

This invention was made with U.S. Government support. The government has certain rights in the invention.

FIELD

This disclosure relates to fuel systems, e.g., for aircraft engines.

BACKGROUND

Fuel delivery systems must perform many functions satisfy engine, e.g., gas turbine engine, requirements. Traditionally, these systems rely on pumps that exceed required capability for much of the operational envelope, either bypassing or throttling the excess flow/pressure—this results in large parasitic power draw. Additionally, these systems usually rely on sets of electromechanical interconnect devices (EMIDs) and valves to perform functions such as shutoff, flow selection, etc.

Such conventional methods and systems have generally been considered satisfactory for their intended purpose. However, there is still a need in the art for improved fuel systems. The present disclosure provides a solution for this need.

SUMMARY

A fuel system can include a selection and shutoff valve (SSOV) configured to allow a primary flow having a primary flow pressure to pass therethrough in a first state such that the primary flow can travel to an output line. The SSOV can also be configured to shut off the primary flow in a second state to prevent the primary flow from travelling to the output line. In the second state, the SSOV can be configured to allow a secondary flow from a secondary flow source to pass therethrough such that the secondary flow can travel to the output line.

In the first state, the SSOV can be configured to communicate a primary input of the SSOV to a primary output of the SSOV that is in fluid communication with the output line. In the first state, the SSOV can be configured to communicate a secondary flow source input of the SSOV to a secondary flow destination output of the SSOV to allow the secondary flow to flow from the secondary flow source to the secondary flow destination.

In the second state, the SSOV can be configured to communicate the secondary flow source input to the primary output or to a secondary output in fluid communication with the output line. In the second state, the SSOV can be configured to communicate a low pressure port of the SSOV to a bypass valve port of the SSOV in fluid communication with a bypass valve (WMBV) via a bypass line to communicate a low pressure to the WMBV. In the first state, the SSOV can be configured to prevent fluid communication between the low pressure port and the bypass valve port.

The primary input can be positioned to cause the primary flow to act on the SSOV to bias the SSOV toward the first position. The SSOV includes a back pressure port configured to be in fluid communication with a back pressure line such that a back pressure acts on the SSOV to bias the SSOV toward the second position such that when the back pressure exceeds a primary flow pressure of the primary flow. In certain embodiments, the SSOV can be biased to the second position via a biasing member, the SSOV moves to the second position.

The system can include a metering valve (MV) operatively connected to a pump to receive a pump pressure and to the SSOV to provide the primary pressure to the primary input port of the SSOV. In certain embodiments, the MV can also be operatively connected to the back pressure port of the SSOV via the back pressure line. The MV can be configured to prevent communication of the pump pressure to the back pressure line in a first metering valve state. The MV can also be configured to communicate the pump pressure to the back pressure line in a second metering valve state to cause the SSOV to move to the second state. The back pressure line can be connected to the low pressure via a first orifice such that in the first metering valve state, the back pressure stagnates at the low pressure, and in the second metering valve state, the back pressure exceeds the primary flow pressure.

In certain embodiments, the MV can be controlled by an electrohydraulic servo valve (EHSV) configured to control a position of the metering valve between the first metering valve state and the second metering valve state. The EHSV can be configured to receive the low pressure and the pump pressure, and to output a first control pressure and a second control pressure to opposing sides of the MV to control a position of the MV.

The system can include a bypass valve (WMBV). The WMBV can be connected to the pump to receive the pump pressure on a first side, and to the SSOV on a second side via the bypass line. The bypass line can be connected to the pump via a second orifice such that in the first state of the SSOV, a bypass line pressure stagnates at the pump pressure, and in the second state of the SSOV, the bypass line pressure is lower than the pump pressure to cause the WMBV to open on the first side of the WMBV to allow the pump pressure to communicate with the low pressure to cause a bypass flow.

In certain embodiments, a solenoid valve can be operatively connected to the pump to receive the pump pressure and to the back pressure line to communicate the pump pressure to the back pressure line in an open state to cause the SSOV to move to the second state, and to prevent the pump pressure from communicating with the back pressure line in a closed state. The back pressure line can be connected to the low pressure via a first orifice such that in the closed state, the back pressure stagnates at the low pressure, and in the open state, the back pressure exceeds the primary flow pressure.

The system can include a minimum pressure valve (MPV) disposed downstream of the primary output of the SSOV between the SSOV and the output line, wherein the secondary output is in direct fluid communication with the output line to bypass the MPV in the second state of the SSOV. Any other suitable components and/or arrangements for the fuel system are contemplated herein.

In accordance with at least one aspect of this disclosure, a fuel system can be configured to direct a main pump flow to an engine in a first mode, and to direct a secondary flow source to the engine in a second mode. The fuel system can be any suitable embodiment of a fuel system disclosed herein, e.g., as described above, for example.

In accordance with at least one aspect of this disclosure, a fuel system can include two independent electric shutoff systems configured to control a selection and shutoff valve (SSOV). The two electric shutoff systems can be configured to control three valves to perform five functions. The fuel system can be any suitable embodiment of a fuel system disclosed herein, e.g., as described above, for example.

In accordance with at least one aspect of this disclosure, an aircraft can include a fuel system as disclosed herein, e.g., as described above. Any other suitable aircraft systems are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
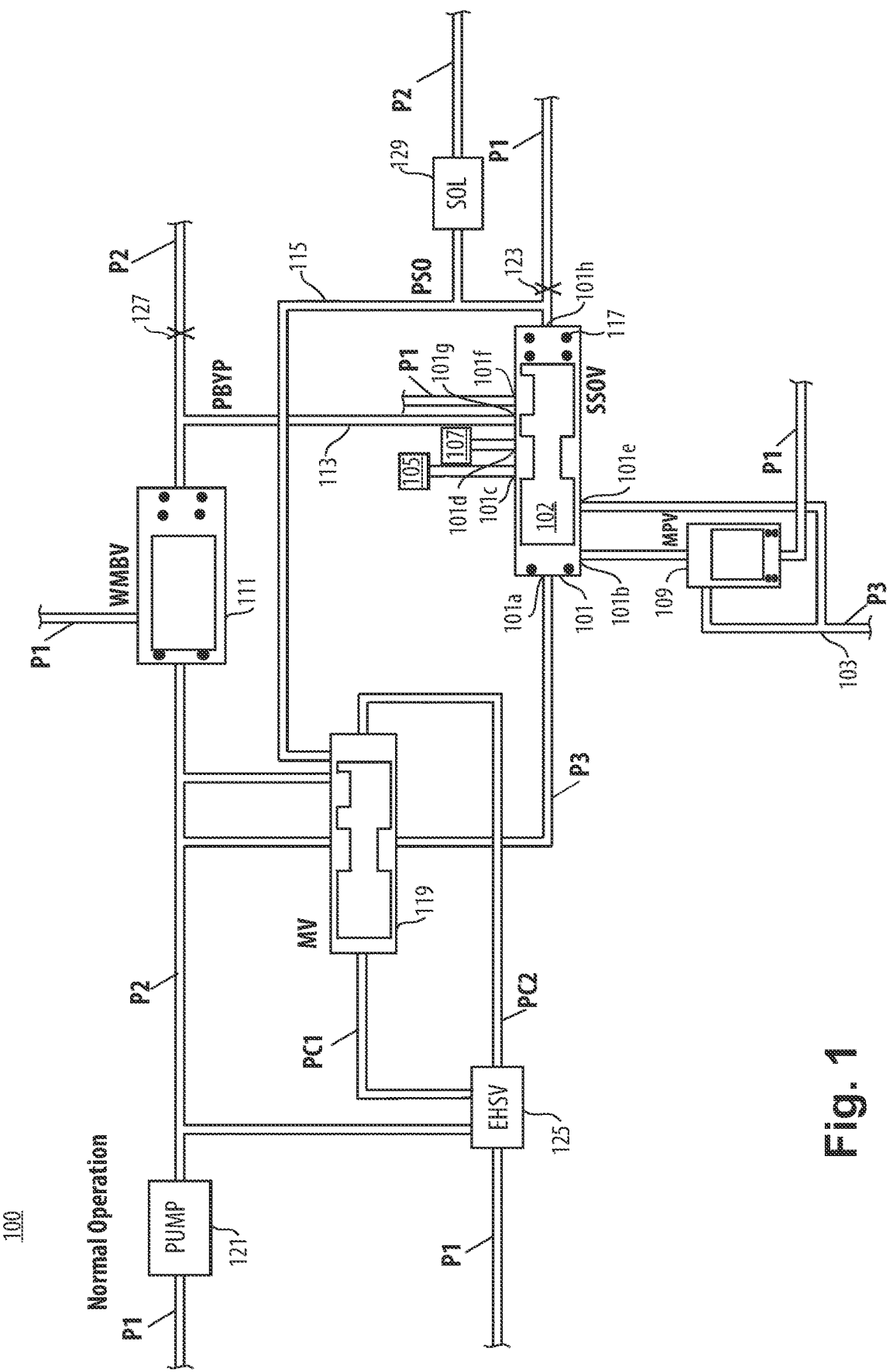
FIG. 1 is a schematic diagram of an embodiment of a fuel system in accordance with this disclosure, shown in a first state, e.g., normal operation.
Figure 2:
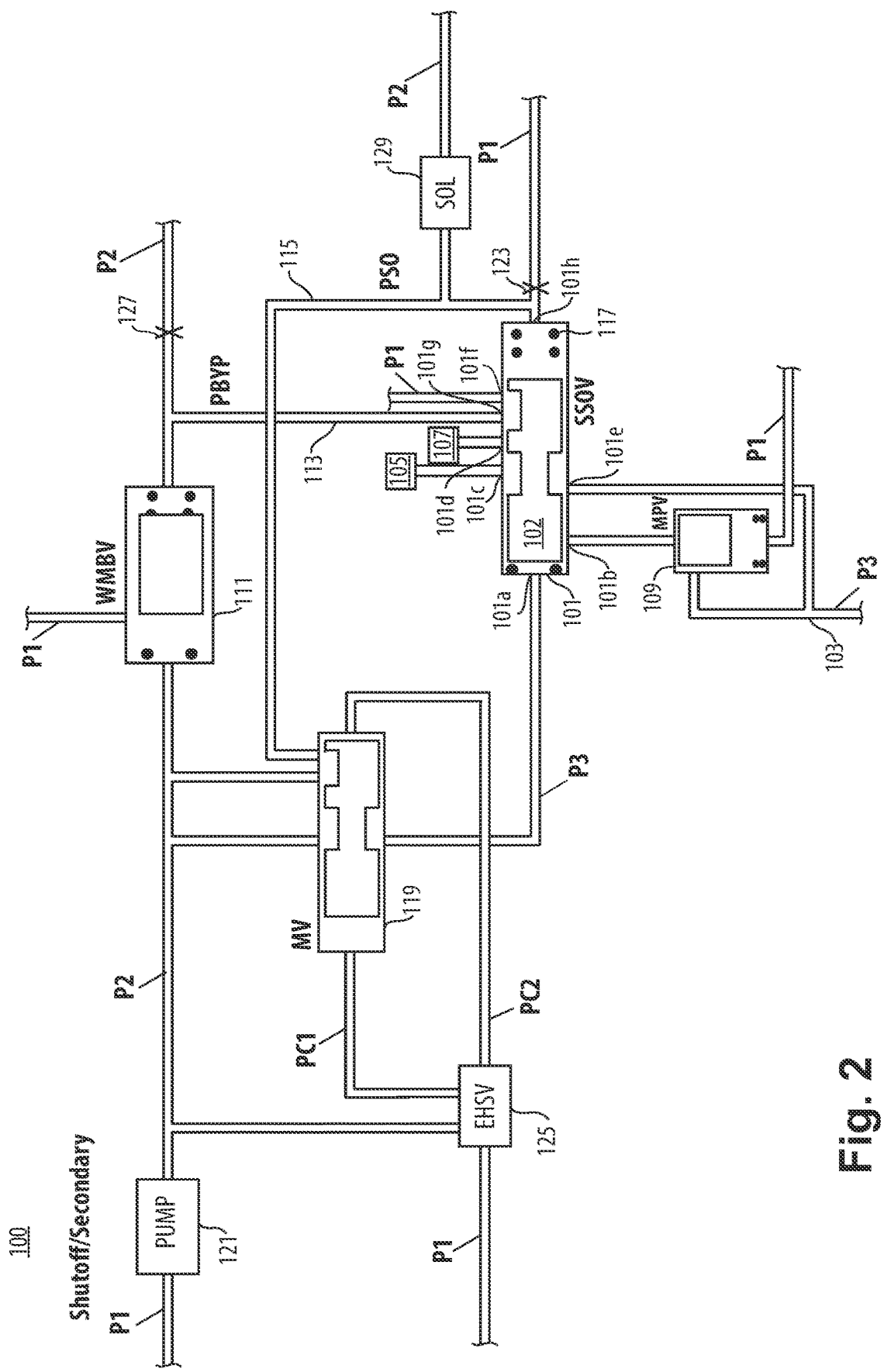
FIG. 2 is a schematic diagram of an embodiment of a fuel system in accordance with this disclosure, shown in a second state, e.g., shutoff/secondary operation.

Reference will now be made to the drawings wherein like reference numerals identify similar structural features or aspects of the subject disclosure. For purposes of explanation and illustration, and not limitation, an illustrative view of an embodiment of a fuel system in accordance with the disclosure is shown in FIG. 1 and is designated generally by reference character 100. Other embodiments and/or aspects of this disclosure are shown in FIG. 2.

In accordance with at least one aspect of this disclosure, as shown in FIG. 1, a fuel system 100 can include a selection and shutoff valve (SSOV) 101 configured to allow a primary flow having a primary flow pressure P3 to pass therethrough in a first state (e.g., a normal operation) such that the primary flow can travel to an output line 103. As shown in FIG. 2, the SSOV 101 can also be configured to shut off the primary flow in a second state (e.g., a shutoff/secondary operation) to prevent the primary flow from travelling to the output line. In the second state, the SSOV 101 can be configured to allow a secondary flow from a secondary flow source 105 (e.g., a secondary pump used to create hydraulic pressure for actuators) to pass therethrough such that the secondary flow can travel to the output line 103.

As shown, the SSOV 101 can be a spool valve that has a spool 102 that slides linearly between the first state and the second state. A seal can be installed in the SSOV 101 to stop leakage during shutdown (e.g., in the second position as shown in FIG. 2). Any other suitable valve type is contemplated herein.

In the first state, the SSOV 101 can be configured to communicate a primary input 101a of the SSOV 101 to a primary output 101b of the SSOV 101 that is in fluid communication with the output line 103 (e.g., indirectly through a minimum pressure valve 109, directly, or otherwise). In the first state, the SSOV 101 can be configured to communicate a secondary flow source input 101c of the SSOV 101 to a secondary flow destination output 101d of the SSOV 101 to allow the secondary flow to flow from the secondary flow source 105 to the secondary flow destination 107.

In the second state, the SSOV 101 can be configured to communicate the secondary flow source input 101c to the primary output 101b or to a secondary output 101e (e.g., as shown in FIGS. 1 and 2) in fluid communication with the output line 103. In the second state, the SSOV 101 can be configured to communicate a low pressure port 101f of the SSOV 101 to a bypass valve port 101g of the SSOV 101 in fluid communication with a bypass valve 111, e.g., a windmill bypass valve (WMBV), via a bypass line 113 to communicate a low pressure P1 to the WMBV 111. In the first state, the SSOV 101 can be configured to prevent fluid communication between the low pressure port 101f and the bypass valve port 101g.

The primary input 101a can be positioned to cause the primary flow to act on the SSOV 101 to bias the SSOV 101 toward the first position (e.g., as shown in FIG. 1). The SSOV 101 can include a back pressure port 101h configured to be in fluid communication with a back pressure line 115 such that a back pressure PSO acts on the SSOV 101 to bias the SSOV 101 toward the second position such that when the back pressure PSO exceeds a primary flow pressure P3 of the primary flow, the SSOV 101 moves to the second position (e.g., as shown in FIG. 2). In certain embodiments, the SSOV 101 can be biased to the second position via a biasing member 117.

The system 100 can include a metering valve (MV) 119 operatively connected to a pump 121 to receive a pump pressure P2 and to the SSOV 101 to provide the primary pressure P3 to the primary input port 101a of the SSOV 101. The MV 119 can be configured to reduce the pump pressure P2 to the primary pressure P3 as a function of its position (e.g., as appreciated by those having ordinary skill in the art) to meter flow to the SSOV 101. The ratio between P1 and P3 can be controlled by the MV 119 as a function of position. As shown in FIGS. 1 and 2, an MV 119 position all the way right can be a shut off position such that there is minimum or no primary flow, and max primary flow is the MV 119 position all the way left.

As shown, in certain embodiments, the MV 119 can also be operatively connected to the back pressure port 101h of the SSOV 101 via the back pressure line 115. The MV 119 can be configured to prevent communication of the pump pressure P2 to the back pressure line 115 in a first metering valve state (e.g., as shown in FIG. 1). The MV 119 can also be configured to communicate the pump pressure P2 to the back pressure line 115 in a second metering valve state (e.g., as shown in FIG. 2) to cause the SSOV 101 to move to the second state. The back pressure line 115 can be connected to the low pressure P1 via a first orifice 123 such that in the first metering valve state, the back pressure PSO stagnates at the low pressure P1, and in the second metering valve state, the back pressure PSO exceeds the primary flow pressure PS3 (e.g., back pressure PSO equals pump pressure P2 as shown in FIG. 2). The first orifice 123 can be sized to ensure the pressure on the SSOV side is always higher than P1 (and P3) in the second metering valve state and/or in the open state of the solenoid valve 129, even though there is leakage through the orifice 123, to cause the SSOV 101 to close. In a normal mode, the pressure would stagnate on the back pressure line 115 and reach P1 through the first orifice 123.

In certain embodiments, the MV 119 can be controlled by an electrohydraulic servo valve 125 (EHSV) configured to control a position of the metering valve 119 between the first metering valve state and the second metering valve state. The EHSV 125 can be configured to receive the low pressure P1 and the pump pressure P2, and to output a first control pressure PC1 and a second control pressure PC2 to opposing sides of the MV 119 to control a position of the MV 119 (e.g., as appreciated by those having ordinary skill in the art of EHSVs).

The system 100 can include a bypass valve (WMBV) 111. The WMBV 111 can be connected to the pump 121 to receive the pump pressure P2 on a first side, and to the SSOV 101 on a second side via the bypass line 113. The bypass line 113 can be connected to the pump 121 via a second orifice 127 such that in the first state of the SSOV, a bypass line pressure PBYP of the bypass line 113 stagnates at the pump pressure P2, and in the second state of the SSOV 101, the bypass line pressure PBYP is lower than the pump pressure P2 (e.g., PBYP being equal to P1) to cause the WMBV 111 to open on the first side of the WMBV 111 to allow the pump pressure P2 to communicate with the low pressure P1 to cause a bypass flow. For example, the low pressure P1 can be a boost pump pressure and can be the upstream pressure provided to the pump 121 such that communicating the pump pressure P2 to the low pressure P1 causes circulation through the pump 121.

In certain embodiments, a solenoid valve 129 can be operatively connected to the pump 121 to receive the pump pressure P2 and to the back pressure line 115 to communicate the pump pressure P2 to the back pressure line 115 in an open state to cause the SSOV 101 to move to the second state, and to prevent the pump pressure P2 from communicating with the back pressure line 115 in a closed state. The back pressure line 115 can be connected to the low pressure P1 via a first orifice 123 such that in the closed state of the solenoid valve 129 (e.g., and the first metering valve state of the MV 119), the back pressure stagnates at the low pressure, and in the open state (e.g., and/or the second metering valve state of the MV 119), the back pressure PSO exceeds the primary flow pressure P3. In certain embodiments, e.g., as shown, the system 100 can include both the MV 119 and the solenoid valve 129 to provide redundancy (and different control paths) in control of the position of the SSOV 101, and/or for any other suitable use.

The system 100 can include a minimum pressure valve (MPV) 109 disposed downstream of the primary output 101b of the SSOV 101 between the SSOV 101 and the output line 103. In certain embodiments, e.g., as shown, the secondary output 101e can be in direct fluid communication with the output line 103 to bypass the MPV 109 in the second state of the SSOV 101. Bypass around the MPV 109 can be optional, e.g., if the secondary flow source 105 is powerful enough to overcome MPV 109.

The MPV 109 can set a minimum delta pressure between primary pressure P3 and low pressure P1 (e.g., and thereby P2 and P1) and can move toward closed position to increase pressure in system. A closure force value (and thus min pressure) can be defined by P1 plus a biasing member value, for example. In certain embodiments, P3 and/or Ps can always be higher than P1. An engine burner can be downstream of the output line 103. Any other suitable components and/or arrangements for the fuel system are contemplated herein.

In accordance with at least one aspect of this disclosure, a fuel system can be configured to direct a main pump flow to an engine in a first mode, and to direct a secondary flow source to the engine in a second mode. The fuel system can be any suitable embodiment of a fuel system disclosed herein, e.g., system 100 as described above, for example.

In accordance with at least one aspect of this disclosure, a fuel system can include two independent electric shutoff systems (e.g., EHSV 125 controlling the MV 119 and the solenoid valve 119) configured to control a selection and shutoff valve (SSOV) 101. The two electric shutoff systems can be configured to control three valves (e.g., MV 119, SSOV 101, and WMBV 111) to perform five functions. The fuel system can be any suitable embodiment of a fuel system disclosed herein, e.g., system 100 as described above, for example.

In accordance with at least one aspect of this disclosure, an aircraft (not shown) can include a fuel system as disclosed herein, e.g., fuel system 100 as described above. Any other suitable aircraft systems are contemplated herein.

Embodiments can include a fuel system that includes a main pump that delivers precisely the required flow at all operating conditions (e.g. through displacement control, speed control, or other). The pump can provide flow to a windmill bypass valve, a metering valve, and an EHSV. The system can include two independent electric shutoff systems. For example, an EHSV can command the metering valve to a position such that the pump pressure P2 is exposed to the backend of the SSOV 101, or a solenoid valve may open to allow the pump pressure P2 at the backend of the SSOV 101, thereby closing the SSOV 101. When the SSOV is closed, low pressure P1 can be exposed to the backend of the WMBV 111, allowing it to open and bypass pump flow. With the SSOV 101 closed, a secondary flow source 105 can be ported to the output line 103 (e.g., connected to an engine burner).

Embodiments can allow a no bypass metering valve system, secondary source selection, and a minimum number of EMIDs to control modes. Embodiments can provide pump protection when flow demand is not present and can provide min pressure regulation for low flow demands. Embodiments of a fuel system can safely accommodate a no-bypass pumping system through the use of two independent electric shutoff systems. Two EMIDs can be used to control three valves which perform five functions.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel system, comprising:
    a selection and shutoff valve (SSOV) configured to:
        in a first state:
            allow a primary flow having a primary flow pressure to pass therethrough such that the primary flow can travel to an output line;
            communicate a primary input of the SSOV to a primary output of the SSOV that is in fluid communication with the output line;
            communicate a secondary flow source input of the SSOV to a secondary flow destination output of the SSOV to allow a secondary flow to flow from a secondary flow source to a secondary flow destination; and
            prevent fluid communication between a low pressure port of the SSOV and a bypass valve port of the SSOV in fluid communication with a bypass valve (WMBV) via a bypass line;
        in a second state:
            shut off the primary flow to prevent the primary flow from travelling to the output line;
            allow the secondary flow from the secondary flow source to pass therethrough such that the secondary flow can travel to the output line; and
            communicate the low pressure port to the bypass valve port to communicate a low pressure to the WMBV;
    wherein, the SSOV includes a back pressure port configured to be in fluid communication with a back pressure line such that a back pressure acts on the SSOV to bias the SSOV toward the second state such that when the back pressure exceeds a primary flow pressure of the primary flow, the SSOV moves to the second state.

2. The fuel system of claim 1, wherein, in the second state, the SSOV is configured to communicate the secondary flow source input to the primary output or to a secondary output in fluid communication with the output line.

3. The fuel system of claim 2, further comprising a minimum pressure valve (MPV) disposed downstream of the primary output of the SSOV between the SSOV and the output line, wherein the secondary output is in direct fluid communication with the output line to bypass the MPV in the second state of the SSOV.

4. The fuel system of claim 1, wherein the primary input is positioned to cause the primary flow to act on the SSOV to bias the SSOV toward the first state.

5. The fuel system of claim 1, wherein the SSOV is biased to the second state via a biasing member.

6. The fuel system of claim 1, further comprising a metering valve (MV) operatively connected to a pump to receive a pump pressure and to the SSOV to provide the primary flow pressure to the primary input of the SSOV.

7. The fuel system of claim 6, wherein the MV is also operatively connected to the back pressure port of the SSOV via the back pressure line, wherein the MV is configured to prevent communication of the pump pressure to the back pressure line in a first metering valve state, and wherein the MV is configured to communicate the pump pressure to the back pressure line in a second metering valve state to cause the SSOV to move to the second state.

8. The fuel system of claim 7, wherein the back pressure line is connected to the low pressure via a first orifice such that in the first metering valve state, the back pressure stagnates at the low pressure, and in the second metering valve state, the back pressure exceeds the primary flow pressure.

9. The fuel system of claim 7, wherein the MV is controlled by an electrohydraulic servo valve (EHSV) configured to control a position of the MV between the first metering valve state and the second metering valve state.

10. The fuel system of claim 9, wherein the EHSV is configured to receive the low pressure and the pump pressure, and to output a first control pressure and a second control pressure to opposing sides of the MV to control a position of the MV.

11. The fuel system of claim 6, further comprising the WMBV, wherein the WMBV is connected to the pump to receive the pump pressure on a first side, and to the SSOV on a second side via the bypass line, wherein the bypass line is connected to the pump via a second orifice such that in the first state of the SSOV, a bypass line pressure stagnates at the pump pressure, and wherein in the second state of the SSOV, the bypass line pressure is lower than the pump pressure to cause the WMBV to open on the first side of the WMBV to allow the pump pressure to communicate with the low pressure to cause a bypass flow.

12. The fuel system of claim 1, further comprising a solenoid valve operatively connected to the pump to receive the pump pressure and to the back pressure line to communicate the pump pressure to the back pressure line in an open state to cause the SSOV to move to the second state, and to prevent the pump pressure from communicating with the back pressure line in a closed state.

13. The fuel system of claim 12, wherein the back pressure line is connected to the low pressure via a first orifice such that in the closed state, the back pressure stagnates at the low pressure, and in the open state, the back pressure exceeds the primary flow pressure.

14. A fuel system configured to:
    in a first mode:
        direct a main pump flow to an engine;
        direct the main pump flow to the engine via a primary flow output of a selection and shut off valve (SSOV);

direct a secondary flow source to a secondary flow destination output of the SSOV to allow a secondary flow to flow from the secondary flow source to a secondary flow destination; and prevent fluid communication between a low pressure port of the SSOV and a bypass valve port of the SSOV in fluid communication with a bypass valve (WMBV) via a bypass line;

in a second mode:

shut off the main pump flow to prevent the main pump flow from travelling to the engine;

direct the secondary flow source to pass through the SSOV such that the secondary flow can travel to the engine; and communicate the low pressure port to the bypass valve port to communicate a low pressure to the WMBV;

wherein, the SSOV includes a back pressure port configured to be in fluid communication with a back pressure line such that a back pressure acts on the SSOV to bias the SSOV toward the second mode such that when the back pressure exceeds a main pump flow pressure of the main pump flow, the SSOV moves to the second mode.

15. A fuel system, comprising:

two independent electric shutoff systems configured to control a selection and shutoff valve (SSOV), wherein the two electric shutoff systems are configured to control three valves to perform five functions, wherein at least one function of the five functions includes, in a first state of a first valve of the three valves;

allowing a primary flow having a primary flow pressure to pass therethrough such that the primary flow can travel to an output line;

communicating a secondary flow source input of the first valve of the three valves to a secondary flow destination output of the first valve of the three valves to allow a secondary flow to flow from a secondary flow source to a secondary flow destination; and preventing fluid communication between a low pressure port of the first valve of the three valves and a bypass valve port of the first valve of the three valves in fluid communication with a second valve of the three valves via a bypass line;

wherein at least one function of the five functions includes, in a second state of the first valve of the three valves;

shutting off the primary flow to prevent the primary flow from travelling to the output line, allowing the secondary flow from the secondary flow source to pass therethrough such that the secondary flow can travel to the output line; and communicating the low pressure port to the bypass valve port to communicate a low pressure to the second valve of the three valves;

wherein, the first valve of the three valves includes a back pressure port configured to be in fluid communication with a back pressure line such that a back pressure acts on the first valve of the three valves to bias the first valve of the three valves toward the second state such that when the back pressure exceeds a primary flow pressure of the primary flow, the first valve of the three valves moves to the second state.

* * * * *